United States Patent
Reial et al.

(10) Patent No.: US 12,101,753 B2
(45) Date of Patent: Sep. 24, 2024

(54) MU-MIMO SCHEDULING

(71) Applicant: Telefonaktiebolaget LM Ericsson (publ), Stockholm (SE)

(72) Inventors: Andres Reial, Höllviken (SE); Oskar Drugge, Hjärup (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 204 days.

(21) Appl. No.: 17/780,612

(22) PCT Filed: Dec. 4, 2019

(86) PCT No.: PCT/EP2019/083601
§ 371 (c)(1),
(2) Date: May 27, 2022

(87) PCT Pub. No.: WO2021/110252
PCT Pub. Date: Jun. 10, 2021

(65) Prior Publication Data
US 2022/0304004 A1    Sep. 22, 2022

(51) Int. Cl.
*H04W 72/12* (2023.01)
*H04B 7/0452* (2017.01)
(Continued)

(52) U.S. Cl.
CPC ........ *H04W 72/121* (2013.01); *H04B 7/0452* (2013.01); *H04W 72/542* (2023.01)

(58) Field of Classification Search
CPC . H04W 72/121; H04W 72/542; H04B 7/0452
See application file for complete search history.

(56) References Cited

U.S. PATENT DOCUMENTS

| 8,964,871 B2 | 2/2015 | Mobasher et al. |
| 9,252,853 B2 | 2/2016 | Sajadieh et al. |

(Continued)

OTHER PUBLICATIONS

"3GPP TR 38.824 V2.0.0", 3rd Generation Partnership Project; Technical Specification Group Radio Access Network; Study on physical layer enhancements for NR ultra-reliable and low latency case (URLLC) (Release 16), Mar. 2019, pp. 1-20.

*Primary Examiner* — Curtis B Odom
(74) *Attorney, Agent, or Firm* — Sage Patent Group (57) ABSTRACT

A multi-user multiple-input multiple-output (MU-MIMO) scheduling method is disclosed for scheduling transmission from a plurality of transmission instances to a plurality of receivers. The method comprises acquiring, for each pair of a transmission instance and a receiver, a communication quality metric and forming a first group of receivers from the plurality of receivers. The first group of receivers is formed by selecting a first receiver as a first group member and associating a first transmission instance to the first receiver and—when a plurality of communication quality metrics of the first transmission instance and not yet selected receivers fulfill a first criterion for sufficient communication quality— selecting a second receiver from the not yet selected receivers as a second group member and associating a second transmission instance to the second receiver. The communication quality metric of the first transmission instance and the second receiver fulfills the first criterion for sufficient communication quality and indicates a lower communication quality than the highest communication quality among the plurality of communication quality metrics that fulfill the first criterion for sufficient communication quality. The method also comprises forming at least a second group of receivers from the plurality of receivers by repeating the selection steps for receivers not included in the first group of receivers, and scheduling MU-MIMO transmission to the (Continued)

receivers of each group from the corresponding associated transmission instances. Corresponding apparatus, deployment server, and computer program product are also disclosed.

20 Claims, 3 Drawing Sheets

(51) Int. Cl.
*H04W 72/121* (2023.01)
*H04W 72/542* (2023.01)

(56) References Cited

U.S. PATENT DOCUMENTS

| | | |
|---|---|---|
| 10,038,996 B1 | 7/2018 | Srinivasa et al. |
| 2019/0123790 A1* | 4/2019 | Tanaka ................ H04W 76/15 |

* cited by examiner

MU-MIMO SCHEDULING

TECHNICAL FIELD

The present disclosure relates generally to the field of wireless communication. More particularly, it relates to multi-user multiple-input multiple-output (MU-MIMO) scheduling for wireless communication.

BACKGROUND

In multi-user multiple-input multiple-output (MU-MIMO), some approaches involves grouping users together and performing MU-MIMO transmission according to the grouping (e.g., transmitting simultaneously to users belonging to a same group).

U.S. Pat. No. 10,038,996 B1 discloses one example approach for user group selection in MU-MIMO configurations. This approach comprises obtaining descriptions of a plurality of communication channels (each associated with a different one of a plurality of receivers), identifying (based on the descriptions of the plurality of communication channels) two or more communication channels that satisfy one or more predetermined constraints related to orthogonality between the two or more communication channels, and selecting receivers associated with the two or more identified communication channels to be included in a group of receivers.

However, the grouping provided by this approach (or other approaches of the prior art) may not provide a desirable performance (e.g., fulfill some performance requirements) in some MU-MIMO communication scenarios.

Therefore, there is a need for alternative approaches for MU-MIMO grouping.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a multi-user multiple-input multiple-output (MU-MIMO) scheduling method for scheduling transmission from a plurality of transmission instances to a plurality of receivers.

The method comprises acquiring (for each pair of a transmission instance and a receiver) a communication quality metric, and forming a first group of receivers from the plurality of receivers.

Forming the first group of receivers comprises selecting a first receiver as a first group member and associating a first transmission instance to the first receiver, and (when a plurality of communication quality metrics of the first transmission instance and not yet selected receivers fulfill a first criterion for sufficient communication quality) selecting a second receiver from the not yet selected receivers as a second group member and associating a second transmission instance to the second receiver.

The communication quality metric of the first transmission instance and the second receiver fulfills the first criterion for sufficient communication quality and indicates a lower communication quality than the highest communication quality among the plurality of communication quality metrics that fulfill the first criterion for sufficient communication quality.

The method also comprises forming at least a second group of receivers from the plurality of receivers by repeating the selection steps receivers not included in the first group of receivers, and scheduling MU-MIMO transmission to the receivers of each group from the corresponding associated transmission instances.

In some embodiments, forming the first group of receivers further comprises (when a plurality of communication quality metrics of the first transmission instance and not yet selected receivers fulfill the first criterion for sufficient communication quality) selecting one or more further receivers from the not yet selected receivers as further group members and associating further transmission instances to the further receivers.

The communication quality metrics of the first transmission instance and the one or more further receivers fulfill the first criterion for sufficient communication quality and indicate lower qualities than the highest communication quality among the plurality of communication quality metrics that fulfill the first criterion for sufficient communication quality.

In some embodiments, the communication quality metrics of the second transmission instance and the one or more further receivers also fulfill the first criterion for sufficient communication quality. Possibly these communication quality metrics also indicate lower qualities than the highest communication quality among the plurality of communication quality metrics that fulfill the first criterion for sufficient communication quality.

In some embodiments, the communication quality metrics of any transmission instance already associated for a group under consideration and the one or more further receivers fulfill the first criterion for sufficient communication quality. Possibly these communication quality metrics also indicate lower qualities than the highest communication quality among the plurality of communication quality metrics that fulfill the first criterion for sufficient communication quality.

In some embodiments, forming the first group of receivers further comprises (when a plurality of communication quality metrics of the first transmission instance and not yet selected receivers fulfill the first criterion for sufficient communication quality) selecting a third receiver from the not yet selected receivers as a third group member and associating a third transmission instance to the third receiver.

The communication quality metric of the first transmission instance and the third receiver fulfills the first criterion for sufficient communication quality and indicates lower qualities than the highest communication quality among the plurality of communication quality metrics that fulfill the first criterion for sufficient communication quality.

In some embodiments, the communication quality metrics of the second transmission instance and the third receiver fulfills also the first criterion for sufficient communication quality and indicates lower qualities than the highest communication quality among the plurality of communication quality metrics that fulfill the first criterion for sufficient communication quality.

In some embodiments, the communication quality metric of the first transmission instance and the first receiver fulfills a second criterion for sufficient communication quality.

In some embodiments, the communication quality metric is indicative of a gain, or an attenuation, of a channel between the transmission instance and the receiver.

In some embodiments, the communication quality metric of the first transmission instance and the second receiver is indicative of an amount of cross-talk generated to the second receiver by transmission from the first transmission instance to the first receiver.

In some embodiments, the communication quality metric of a transmission instance and the second receiver is indicative of an amount of cross-talk generated to the second receiver by transmission from the transmission instance (e.g., a transmission instance already associated for the group under consideration) to one or more receivers (e.g., all receivers already selected as members of the group under consideration).

In some embodiments, the first criterion for sufficient communication quality comprises the communication quality metric falling on a first side of a threshold, wherein the first side of the threshold indicates lower communication quality between the transmission instance and the receiver of the communication quality metric than does a second side of the threshold.

In some embodiments, the method further comprises configuring the receivers to provide communication quality metric information.

In some embodiments, the method further comprises (when no communication quality metrics of the first transmission instance and not yet selected receivers fulfill the first criterion for sufficient communication quality) repeating the forming steps while selecting another first receiver and/or associating another first transmission instance for at least one of the groups. In some embodiments, the method further comprises (when no communication quality metrics of the first transmission instance and not yet selected receivers fulfill the first criterion for sufficient communication quality) repeating the forming steps while using an adjusted first criterion for sufficient communication quality.

In some embodiments, the receivers are stationary, or substantially stationary, and the method is performed during a pre-operational time period, wherein the pre-operational time period does not comprise communication transmission.

In some embodiments, the method is performed by a deployment server of an industrial environment deployment comprising the receivers.

In some embodiments, the plurality of transmission instances are either of a plurality of distributed transmission points, and a plurality of transmission beams.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a multi-user multiple-input multiple-output (MU-MIMO) scheduling apparatus for scheduling of transmission from a plurality of transmission instances to a plurality of receivers.

The apparatus comprises controlling circuitry configured to cause acquisition (for each pair of a transmission instance and a receiver) of a communication quality metric, and forming of a first group of receivers from the plurality of receivers by causing selection of a first receiver as a first group member and associating a first transmission instance to the first receiver, and (responsive to a plurality of communication quality metrics of the first transmission instance and not yet selected receivers fulfilling a first criterion for sufficient communication quality) selection of a second receiver from the not yet selected receivers as a second group member and association of a second transmission instance to the second receiver.

The communication quality metric of the first transmission instance and the second receiver fulfills the first criterion for sufficient communication quality and indicates a lower communication quality than the highest communication quality among the plurality of communication quality metrics that fulfill the first criterion for sufficient communication quality.

The controlling circuitry is also configured to cause forming of at least a second group of receivers from the plurality of receivers by causing repetition of the selection steps for receivers not included in the first group of receivers, and scheduling of MU-MIMO transmission to the receivers of each group from the corresponding associated transmission instances.

A fourth aspect is a deployment server comprising the MU-MIMO scheduling apparatus of the third aspect.

A fifth aspect is a network node (e.g., a base station) comprising the deployment server of the fourth aspect.

In some embodiments, the deployment server is for an industrial environment deployment comprising the receivers.

In some embodiments, any of the above aspects may additionally have features identical with or corresponding to any of the various features as explained above for any of the other aspects.

An advantage of some embodiments is that alternative approaches for MU-MIMO grouping are provided.

Another advantage of some embodiments is that MU-MIMO grouping may be achieved that is particularly suitable for scenarios where it is more important that each (e.g., every) user is granted a sufficient throughput than that (per user or overall) throughput is maximized. For example, some embodiments may result in that each (e.g., every) user is granted a sufficient throughput.

Generally, when a sufficient throughput is referred to herein, it should be understood that such a requirement may be—alternatively or additionally—formulated in terms of a sufficient latency, or a sufficient signal-to-interference ratio (SIR), or similar.

Another advantage of some embodiments is that the amount of overhead signaling and/or processing efforts (e.g., measurement, selection, etc.) may be relatively low.

Another advantage of some embodiments is that the robustness of the determined grouping is strong. Robustness may, for example, refer to long-term reliability in the presence of instantaneous channel variations.

Generally, communication quality may refer to desired signal strength and/or interference strength. Thus, a relatively low communication quality may refer to a relatively low desired signal strength and/or to a relatively high interference strength.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, the MU-MIMO grouping provided by approaches of the prior art may not provide a desirable performance in some MU-MIMO communication scenarios, e.g., scenarios where it is more important that each (e.g., every) user is granted a sufficient throughput than that throughput is maximized, and/or scenarios which are interference-limited rather than coverage-limited, and/or scenarios where long-term robust grouping decisions are preferable.

An example where such alternative performance requirements may be applicable is industrial environment deployments, e.g., a communication network set up within a factory. Such a communication network may typically comprise a plurality of wireless communication devices (such as sensors, switches, parameter levers, etc.), one or more network access points, and a network controlling device (e.g., a deployment server). In the wording of the claims, the wireless communication devices exemplify the receivers, and a transmission instance may be exemplified by a network access point or by a transmission resource usable by a network access point. The controlling device may be separate from the network access point(s), or may be comprised in a same device as a network access point.

Traditionally, cellular radio deployments have typically been used by Mobile Network Operators (MNO) to provide mobile broadband. Other use-cases related to machine type communication (MTC) are emerging; e.g. massive MTC and critical MTC. Massive MTC deals with communication of devices deployed in large numbers, with focus on low power consumption and low cost. Critical MTC deals with communication requiring high reliability, where reliability is defined in terms of low probability of failing to deliver traffic packets within a certain time period. One example of critical MTC is the manufacturing use case (an example of an industrial environment deployment). Currently, critical MTC communication within manufacturing industries is to a large extent served by wired networks, but using digitalization and a wireless approach (a.k.a. Industry 4.0) might provide more flexibility to rearrange the production, lower risk for error due to cable failure, and lower cost due to replacement of worn/old cables.

One example that models a factory scenario can be found in third generation partnership project (3GPP) technical report (TR) 38.824 V2.0.0, Appendix A.2.2. The example outlines a factory hall of dimensions (in meters) of 120× 50×10. It is assumed that there could be up to 40 users per cell and 12 cells within the hall, summing up to 480 users. The traffic model can be found in the requirements section (3GPP TR 38.824 V2.0.0, Appendix A.1.2), which suggests a latency requirement of 1 ms over the air interface, with 20 bytes packets transmitted once every 2 ms.

These kinds of scenarios may differ from normal mobile broadband scenarios, for example, in that there are many users within a relatively small area, in that the users are sending packets very frequently, and in that the packets have tight requirements on latency. In contrast to classical deployments, many industrial deployments do not require maximized per-user throughput or sum throughput; but rather a sufficient performance or quality of service (QoS) at a predetermined (sufficient) throughput level.

A simple radio network deployment that would be suitable for creating a stable link quality for all users may comprise a single cell in the factory hall, which controls the scheduling such that only a single UE can use each time/frequency resource. Such a deployment might be possible partly because the serviced area is so small (smaller by orders of magnitude than supported cell radii in mobile networks). A drawback of this type of deployment is that the capacity will be limited.

It might therefore seem attractive to deploy multiple cells in the factory hall in order to attempt to re-use the frequency by scheduling different UE:s in different cells. However, because the frequency resources are shared among multiple cells, the received signal-to-interference-and-noise ratio (SINR) will be hard to predict, leading to difficulties to provide reliable communication according to a stipulated latency requirement.

Another option for deployment might be to use MU-MIMO (e.g., in single cell deployment) in order to efficiently share the time/frequency resources. As mentioned before, MU-MIMO traditionally groups together multiple users, which are suitable to group based on some criterion, exploiting spatial multiplexing to enable simultaneous transmission to the users within a group, using the same time/frequency resources.

One challenge for MU-MIMO operation is that channels of co-scheduled users are generally not fully orthogonal, but typically experience signal leakage from one user channel to another user channel. In some MU-MIMO deployments, user separation and channel orthogonality is pursued via user-specific beamforming.

Grouping of users to be served simultaneously in MU-MIMO may use instantaneous, or recent, channel state information reference signal (CSI-RS) measurements and reports to determine suitable UE combinations in relation to time-varying channel and interference components. This approach typically has a greedy character, starting with one user and adding additional users while maximizing the achievable rate (or other sum performance metric) at each step. A fairness aspect may also be considered, ensuring that UE:s in poor conditions are scheduled at least according to some minimum requirement. Typically, these approaches lead to best effort transmission, wherein UE:s with different channel conditions experience different effective throughput and latency.

However, industrial deployments of wireless networks require high robustness and reliability. Thus, conventional MU-MIMO user grouping approaches may not provide sufficiently robust grouping in some scenarios.

Thus, there is a need for MU-MIMO user grouping approaches that are robust, are suitable for industrial deployments, and are not unnecessarily complex.

In the following, embodiments will be described where alternative approaches for MU-MIMO grouping are provided.

According to some embodiments, the alternative approaches comprise determining which receivers have a channel cross-correlation which fulfills a first criterion for sufficient communication quality (e.g., cross-correlation being below a threshold value) and, among those receivers, grouping together receivers that have as high as possible channel cross-correlation. Such an approach may typically increase the possibility to accommodate relatively many receivers per group.

According to some embodiments, pre-operation semi-static grouping is used to partition UE:s in a cell into groups for time/frequency resource re-use in MU-MIMO. The grouping is based on estimated long-term cross-talk, or signal leakage, characteristics between the propagation channels of the individual UE:s in the cell. UE:s with low cross-talk are grouped for simultaneous transmission in same physical resource blocks (PRB:s).

In some embodiments, a main grouping criterion is to ensure a predetermined minimum link quality for each UE based on given system requirements; not necessarily maximizing per-user link potential, or sum rate over user groups. Cross-talk estimation for static or rarely-varying industrial environments may be based on an explicit environment evaluation procedure, performed ahead of MU-MIMO transmissions in regular operation (i.e., not based on traditional CSI-RS measurements and reports). The validity of the grouping may be repeatedly verified as time passes, and may be updated periodically and/or when required.

Thus, according to some embodiments, a robust approach is provided for accommodating a larger number of UE:s with capped data rate requirements in a semi-static environment than what is possible using conventional MU-MIMO grouping.

In some embodiments, the grouping is achieved with less total computational complexity than for conventional MU-MIMO grouping scenarios.

Further, some embodiments lowers the probability of leftover UE:s that do not fit into an acceptable MU-MIMO group, compared to conventional MU-MIMO grouping.

Figure 1:
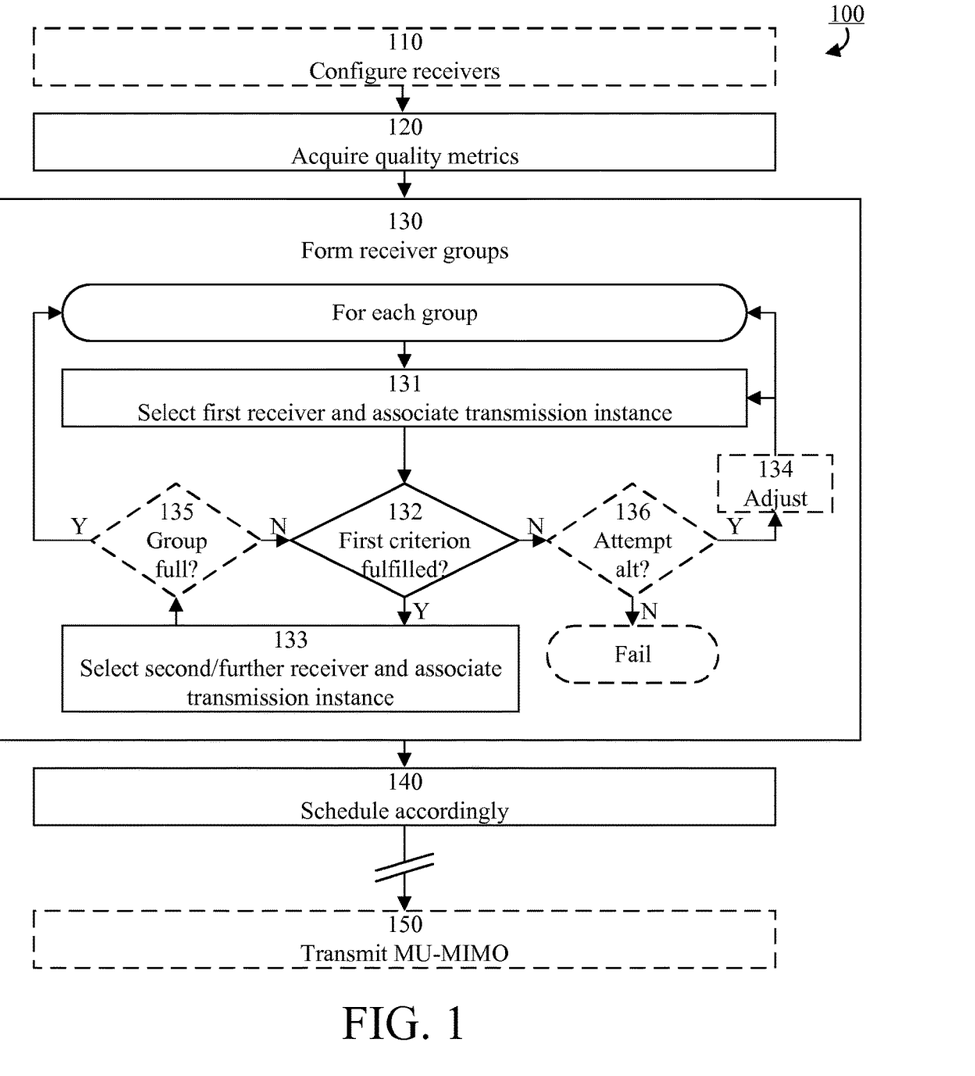
FIG. 1 is a flowchart illustrating example method steps according to some embodiments.

FIG. 1 illustrates an example method 100 according to some embodiments. The method 100 is a multi-user multiple-input multiple-output (MU-MIMO) scheduling method for scheduling transmission from a plurality of transmission instances to a plurality of receivers. The method may, for example, be performed by a network controlling device (e.g., a deployment server) comprising, or being associated with, a scheduler.

As mentioned before the receivers may be the users of the MU-MIMO scheme. For example, a receiver may be a user equipment (UE), or similar. A transmitter instance may, for example, be a transmission point (e.g., a network access point; such as a TRP, an eNB, a gNB, etc.), or a transmission resource (e.g., a transmission beam usable by a transmission point or an antenna element of a transmission point). A transmission point (TRP) may, for example, refer to a (e.g., 64×64) antenna panel which uses beam-forming to create orthogonality between users, or a number of distributed TRPs (e.g., remote radio units—RRU:s). This will be exemplified further in connection to FIGS. 2 and 3.

As illustrated by step 120, the method comprises acquiring a (respective) communication quality metric for each pair of a transmission instance and a receiver. Acquiring the communication quality metrics may, for example, comprise receiving information indicative of the communication quality metrics from the receivers and/or calculating the communication quality metrics.

The information may include any suitable channel information. Examples include: channel state information, CSI, channel coefficients, information obtained via uplink sounding reference signals, UL SRS, information obtained via downlink channel state information reference signals, DL CSI-RS, information obtained via demodulation reference signals, DMRS, information reported by UE, radio resource measurements, RRM, beam management, BM, measurements, etc.

The communication quality metrics may be any metric suitable for use in receiver grouping. Typically, a communication quality metric may be indicative of a quality of the link between transmission instance and receiver (e.g., in terms of received signal strength of a desired signal and/or in terms of interference strength; leakage power). For example, the communication quality metric may comprise—or be indicative of—one or more of: a received signal strength indicator (RSSI) for the link, a reference signal received power (RSRP) of the link, a signal-to-interference ratio (SIR) of the link, a gain of the link, or an attenuation of the link.

Arranging the communication quality metrics such as RSSI or RSRP in a matrix structure where each row (or column) relates to a transmission instance and each column (or row) relates to a receiver typically results in an indication of cross-correlations (cross-talk) between the different links of the MU-MIMO system, which may in turn be used to determine SIR and/or potential throughput for each of the links.

As illustrated by optional step 110, the receivers may be configured (e.g., by transmission of a configuration signal) to provide the communication quality metric information. The configuration may, for example, cause the receivers to provide the communication quality metric information periodically and/or responsive to an event (e.g., a network request or detection of undesirable performance).

In step 130, at least two (non-overlapping) groups of receivers are formed based on the communication quality metrics, and each receiver is associated with a transmission instance.

In step 140, MU-MIMO transmission is scheduled to the receivers of each group from the corresponding associated transmission instances.

As illustrated by optional step 150, the method may also comprise performing the MU-MIMO transmission as scheduled. According to typical examples, the receivers in each group use different transmission instances but may share one or more other resources (e.g., time/frequency resources). Thus, within a group, interference (cross-talk) from the transmission instance of one linked pair to the receiver of another linked pair should preferably be low enough for resource sharing. Different groups may use different resources (e.g., time/frequency resources).

When the receivers are stationary, substantially stationary, or semi-stationary, (e.g., in an industrial environment deployment), steps 110, 120, 130, and 140 may be performed during a pre-operational time period not comprising communication transmission such as that of step 150. An example of a pre-operational time period is when the industrial environment deployment is offline.

In some embodiments, steps 110, 120, 130, and 140 may (alternatively or additionally) be performed periodically and/or responsive to an event (e.g., detection of undesirable performance; such as deteriorating SIR, breach of requirements regarding latency, etc.). The periodicity and/or events may, for example, correspond to those described for provision of the communication quality metric information. Typically, a periodical repetition of these steps exhibits a relatively long period compared to MU-MIMO grouping according to the prior art.

A possible definition of substantially stationary may be that the receivers are fixedly mounted within the environment, or are mounted such that they are only moving within a limited area (e.g., attached to a manufacturing bench, attached to an actuator in turn attached to the bench, or attached to a movable part of stationary machine). Then, the movement of receivers typically only relates to vibrations and/or minor position changes.

More substantial movement (e.g., due to the environment setup being actively changed, for example, relocation of machinery) might be handled by refreshing the grouping after such substantial movement.

Possible advantages of these embodiments include that the amount of overhead signaling and/or processing efforts (e.g., measurement, selection, etc.) may be relatively low.

Step 130 may comprise sequentially forming a first group, a second group, and possibly one or more further groups (e.g., a third group, a fourth group, etc.) by iterating two or more selection steps as will be described in the following (for the first group). When the selection steps are performed for the second and further groups, it should be generally understood that the selection is among receivers that have not yet been selected as a member of any group (i.e., the groups are typically non-overlapping).

Forming of a group (e.g., the first group) of receivers from the plurality of receivers comprises selecting a first receiver as a first group member and associating a first transmission instance to the first receiver, as illustrated by sub-step 131. This may be collectively seen as selecting a first link for the group.

The selection of the first receiver may be based on any suitable condition(s). For example, the first receiver may be selected at random, or as the receiver that has the strongest signal quality with regard to a transmission instance.

Then, it is determined in sub-step 132 whether a plurality of communication quality metrics of the first transmission instance and not yet selected receivers fulfill a first criterion for sufficient communication quality.

For example, sub-step 132 may be implemented as determining how much interference (cross-talk) will be caused to other receivers by transmissions of the first transmission instance to the first receiver. The communication quality metric (e.g., RSSI, RSRP, gain, or similar) for each pair (link) comprising the first transmission instance may, for example, be compared with a (first) threshold value, and it may be determined that the communication quality metric fulfills the first criterion if it is lower than the first threshold value.

When a plurality of communication quality metrics of the first transmission instance and not yet selected receivers fulfill the first criterion for sufficient communication quality (Y-path out of sub-step 132), a second receiver from the not yet selected receivers is selected as a second group member and a second transmission instance (not yet associated for the group) is associated to the second receiver, as illustrated by sub-step 133.

The second receiver is selected among those (not yet selected) receivers that have a communication quality metric in relation to the first transmission instance that fulfills the first criterion for sufficient communication quality. This may be interpreted as selecting a receiver that is not interfered too much by transmissions using the first transmission instance (e.g., by transmissions from the first transmission instance to the first receiver; using the communication link there between).

The second receiver is selected as a receiver that has a communication quality metric in relation to the first transmission instance that indicates a lower communication quality (e.g., higher interference) than the highest communication quality among the plurality of communication quality metrics that fulfill the first criterion for sufficient communication quality. This may be interpreted as not selecting the receiver that is interfered least by transmissions using the first transmission instance (e.g., by transmissions from the first transmission instance to the first receiver; using the communication link there between).

Thus, the second receiver may be selected such that its communication quality metric (e.g., RSSI, RSRP, gain, or similar) in relation to the first transmission instance does not indicate the lowest interference by transmissions using the first transmission instance (e.g., transmissions from the first transmission instance to the first receiver). For example, the second receiver may be selected such that its communication quality metric in relation to the first transmission instance indicates the highest interference by transmissions using the first transmission instance (while still fulfilling the first criterion for sufficient communication quality).

The association between a selected receiver and a corresponding transmission instance (in sub-steps 131 and 133) may be based on any suitable condition(s). For example, the selected receiver may be associated with a transmission instance such that the communication quality metric relating to the link between them fulfills a (second) criterion for sufficient communication quality.

For example, the association may be implemented as determining a link with sufficiently good signal reception. The communication quality metric (e.g., SIR, RSSI, RSRP, gain, or similar) for each pair (link) comprising the selected receiver and transmission instances not yet associated for the group may, for example, be compared with a (second) threshold value, and it may be determined that the communication quality metric fulfills the second criterion if it is higher than the second threshold value. In some embodiments, the best (e.g., with highest communication quality metric) transmission instances not yet associated for the group may be used.

After selection of the second receiver and association of the second transmission instance, sub-steps 132 and 133 may be iterated until the group is full (as illustrated by optional sub-step 135 and the N-path out therefrom) or until no communication quality metric of the associated transmission instance and not yet selected receivers fulfill the first criterion for sufficient communication quality (N-path out of sub-step 132).

The iteration to form a group typically comprises selection of a first receiver as a first group member and associating a first transmission instance to the first receiver, and (responsive to a plurality of communication quality metrics of the first transmission instance and not yet selected receivers fulfilling a first criterion for sufficient communication quality) selection of a further (e.g., second, third, fourth, etc.) receiver from the not yet selected receivers as a further group member and association of a corresponding transmission instance to the further receiver. Typically, the further receivers are selected one at a time as indicated by the iteration of FIG. 1.

For each selection of a receiver, the communication quality metric of an earlier associated transmission instance and the selected receiver typically fulfills the first criterion for sufficient communication quality and indicates a lower communication quality than the highest communication quality among the plurality of communication quality metrics that fulfill the first criterion for sufficient communication quality. When all communication quality metrics of earlier associated transmission instances and not yet selected receivers that fulfill the first criterion for sufficient communication quality are equal, any of the corresponding receivers may be selected (e.g., at random). When there is only one not yet selected receiver, it may be selected if the communication quality metrics of earlier associated transmission instances and the receiver fulfill the first criterion for sufficient communication quality. When there is only one not yet selected receiver and the communication quality metrics of earlier associated transmission instances and the receiver do not fulfill the first criterion for sufficient communication quality, the method may be restarted with some adjustment (alternative grouping) as will be explained below.

When a group is full (Y-path out of sub-step 135), the method continues executing step 130 for a new group until all groups have been formed (e.g., until all users have been served; which may be exemplified by all UE receivers having been selected as a member of a group for downlink transmission and/or by all UE transmitters having been selected as a member of a group for uplink transmission).

Generally, the group size may differ between groups, or may be the same for all groups. Also generally, the group size may be pre-determined or dynamically variable.

When no communication quality metric of the associated transmission instance and not yet selected receivers fulfill the first criterion for sufficient communication quality (N-path out of sub-step 132), it may be determined whether an alternative grouping should be attempted as illustrated by optional sub-step 136.

When an alternative grouping should be attempted (Y-path out of sub-step 136), the entire grouping procedure—or the forming of the current group—may be restarted with adjustment of one or more setting as illustrated by optional sub-step 134).

The adjustment of sub-step 134 may, for example, comprise adjustment of one or more of: criterion for selection of the first receiver (e.g., selecting another first receiver for one or more of the groups), criterion for association of transmission instance to selected receiver (second criterion for sufficient communication quality; e.g., adjustment of second threshold value), criterion for accepted cross-talk (first criterion for sufficient communication quality; e.g., adjustment of first threshold value), group size, or similar.

When an alternative grouping should not be attempted (N-path out of sub-step 136; e.g., if a maximum number of attempts have already been made, or if adjustment of settings is not possible/feasible/advisable), the grouping may be declared as failed.

Figure 2:
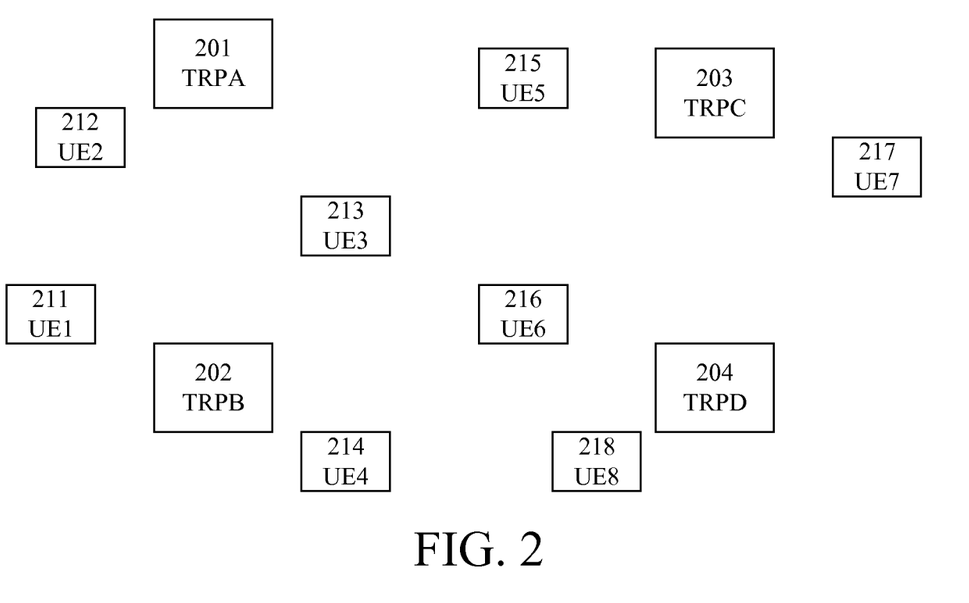
FIG. 2 is a schematic drawing illustrating an example scenario according to some embodiments.
Figure 3:
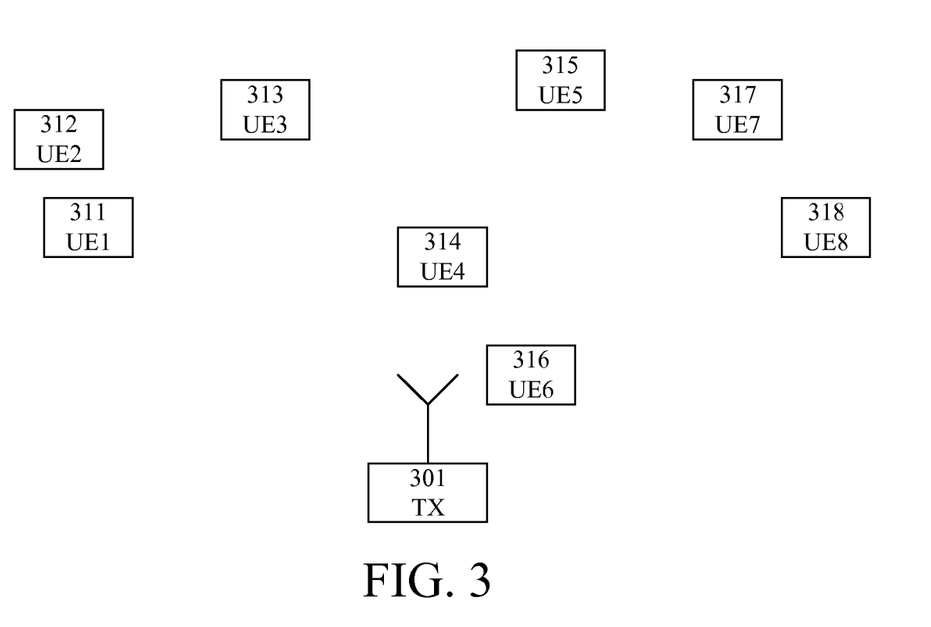
FIG. 3 is a schematic drawing illustrating an example scenario according to some embodiments.

Some different embodiments of transmitter instances will now be exemplified with reference to FIGS. 2 and 3, each of which schematically illustrates an example scenario according to some embodiments. In the scenario of FIG. 2, the transmission instances are transmission points. In the scenario of FIG. 3, the transmission instances are transmission resources (transmission beams).

FIG. 2 may be used to illustrate an approach where signal quality between transmission points and UE:s is used as communication quality metric. The scenario of FIG. 2 shows four transmission instances (TRPA, TRPB, TRPC, TRPD) 201, 202, 203, 204 and eight receivers (UE1, UE2, UE3, UE4, UE5, UE6, UE7, UE8) 211, 212, 213, 214, 215, 216, 217, 218. Thus, the transmitter instances may be comprised in dispersed (i.e., not co-located) transmission points.

In deployments with multiple non-directional TRPs per gNB, MU-MIMO can be implemented (for example) by transmitting a first layer from TRPA to UE1 and a second layer from TRPB to UE2, where the TRP-UE links are selected to have low signal leakage or cross-talk.

In some embodiments (e.g., using distributed antenna systems with multiple TRP:s as in FIG. 2), the cross-talk evaluation for a UE may focus on the set of TRP:s that has a strong link (e.g., high RSRP) to the UE; it is only from those TRP:s the UE can receive problematic interference during MU-MIMO operation.

For example, all UE:s can be configured to report RSRP for the different TRP:s and a MU-MIMO transmission group may be formed as subset of UE:s wherein no two UE:s have a strong link with regard to the same TRP, thereby avoiding excessive interfering link quality (compare with first criterion for sufficient communication quality). MU-MIMO precoding may then comprise transmitting to each UE in the group from a TRP that has a sufficiently good link for that UE, i.e., a sufficient serving link quality (compare with second criterion for sufficient communication quality).

An UE/TRP layout as that of FIG. 2 will now be considered as an example, and the average signal quality (in dB; fictitious relative units) will be assumed to be representable by the following table:

|      | UE1 | UE2 | UE3 | UE4 | UE5 | UE6 | UE7 | UE8 |
|------|-----|-----|-----|-----|-----|-----|-----|-----|
| TRPA | 10  | 35  | 25  | 2   | 12  | 5   | −5  | −7  |
| TRPB | 30  | 11  | 21  | 34  | 4   | 17  | 1   | −6  |
| TRPC | −4  | 0   | 2   | 0   | 18  | 3   | 32  | 12  |
| TRPD | −8  | −6  | 3   | 1   | 7   | 17  | 12  | 28  |

If aiming for a spatial reuse of two (i.e. eight UE:s served during four transmission occasions, e.g., slots), each group should have two UE members. The threshold for a sufficient serving link quality can be termed X and the threshold for an excessive interfering link quality can be termed Y.

The groups may be selected so that the second UE of each group exhibits a link whose interference contribution is the largest available that is still below the excessive interference threshold. This avoids forming groups with unnecessarily good interference properties, thereby reducing the risk of using UE:s that could be suitable candidates for other groups.

In the example of grouping the UE:s into four MU-MIMO pairs (groups) where X=15 dB and Y=3 dB, the group-forming process may comprise selecting (compare with step 131 of FIG. 1) the UE (UE2) with strongest link available with regard to a TRP (e.g., TRP A; i.e., UE2 will be associated with TRPA) and selecting (compare with step 133 of FIG. 1) a UE (UE4) that has the strongest below-threshold-Y link with regard to TRPA and an above-threshold-X link to another TRP (TRPB; i.e., UE2 will be associated with TRPB), and define the corresponding UE pair as a MU-MIMO group.

Then the process may be repeated in a reduced table where the columns for UE2 and UE4 are removed. The second group may comprise UE7 associated with TRPC and UE3 associated with TRPA, the third group may comprise UE1 associated with TRPB and UE8 associated with TRPD, and the fourth group may comprise UE5 associated with TRPC and UE6 associated with TRPD.

Generally, it may be permissible to use the same TRP in multiple groups. However, if the groups are frequency multiplexed, additional constraints of not using the same TRP in multiple simultaneously transmitted groups may be enforced (e.g., if analog beamforming is used where a TRP or antenna panel can transmit signals in a single direction at a time).

The example can be extended in a straightforward manner to any group size (e.g., selecting triplets of UE:s, where interfering links for the three TRP-UE pairs in a group should be below a threshold Y).

Depending on the aggressiveness of the targeted partitioning and resource usage in relation to deployment and link conditions, an execution of the group-forming process may not provide a satisfactory solution (i.e., no suitable grouping may be possible at some stage of the process; compare with N-path out of step 132 in FIG. 1). The procedure may then be repeated, starting with a different UE for one or more of the groups. If a solution is not obtained after a predetermined number of attempts, the target grouping parameters may be changed, or the deployment may be modified (e.g. by increasing isolation between the TRP:s).

In some embodiments, the permissible transmission patterns may be determined by explicitly considering SIR resulting from a certain UE grouping and serving TRP association (e.g. determining SIR as serving_power/sum_of_interfering_powers).

In some embodiments (e.g., in industrial deployments where UE mobility is limited), the conditions of sufficiently strong link and/or excessively interfering link may be determined based on physical placement of the TRP:s and UE:s (e.g., inter-TRP isolation and/or physical distance between UE:s and/or TRP:s). The UE group-forming procedure may be similar to that described for FIG. 2, replacing link quality metrics in the table with values indicating isolation and/or distance (e.g., one or another non-zero values for non-isolated UE/TRP and zero for isolated UE/TRP).

FIG. 3 may be used to illustrate an approach where beam signal quality between transmission point and UE:s, or channel covariance, is used as communication quality metric. The scenario of FIG. 3 shows one transmitter node (TX) 301 capable of handling several transmission instances (e.g., beams) and eight receivers (UE1, UE2, UE3, UE4, UE5, UE6, UE7, UE8) 311, 312, 313, 314, 315, 316, 317, 318. Thus, the transmitter instances may be antenna combinations within an antenna array for generating directional beams.

In some embodiments (e.g., using antenna arrays in one or more TRP:s), the cross-talk is estimated with respect to the set of beams or precoding configurations for which a UE exhibits strong quality. For example, all UE:s may report RSRP for a set of RRM, BM or CSI measurement beams, and a MU-MIMO transmission group may be formed from a subset of UE:s wherein each UE has at least one strong beam (second criterion for sufficient communication quality) for which no other UE has reported a quality metric exceeding a threshold (first criterion for sufficient communication quality). MU-MIMO precoding may then comprise transmitting to each UE in the group using one or more beams that exceeds a quality threshold for only that UE (second and first criterion for sufficient communication quality). The UE group-forming procedure may be similar to that described for FIG. 2, replacing link quality metrics for individual TRP:s with link quality metrics for individual beams.

In some embodiments (also suitable for antenna arrays in one or more TRP:s; refer to FIG. 3), the cross-talk or leakage between the signals for different UE:s signals captured via channel estimates, or a channel covariance matrix, for all UE:s in the cell. For example, the UE:s may transmit UL sounding signals (e.g., sounding reference signals, SRS, in long term evolution, LTE, or new radio, NR) and the network node (e.g., TRP, eNB, gNB) may determine UL channel estimates for all UE:s using its antenna array.

In some embodiments, the channel estimates (e.g., in beam, or element, domain) at time t for a set of $N_u$ users may be denoted $H_t$ (size $N_a \times N_u$), where $N_a$ is the number of antenna elements at the TRP. A channel covariance matrix may then be estimated as $R=E_t[H_t H_t^H]$, where the expectation is obtained by applying averaging to correlation values over time. A number of time samples for each transceiver antenna pair and UE may be collected and used to form long-term covariance estimates.

When the long-term channel covariance matrix R is available, correlation magnitudes for different UE:s in the covariance matrix may be used to identify users with statistically sufficiently uncorrelated channels, reflecting, e.g., directional or geographical separation within the TRP coverage area. MU-MIMO groups may then be formed by grouping together UE:s whose channels exhibit long-term correlation magnitudes below a threshold (first criterion for sufficient communication quality).

For example, in the following table, each entry expresses (in arbitrary relative units) the magnitude of channel correlations $r_{k1,k2}=|E_t[h_{k1}^H h_{k2}]|$ between two UE:s k1 and k2, where $h_k$ is the column vector of length $N_a$ of channel estimates for user k:

| | UE 1 | UE 2 | UE 3 | UE 4 | UE 5 | UE 6 | UE 7 | UE 8 |
|---|---|---|---|---|---|---|---|---|
| UE 1 | | 0.9 | 0.5 | 0.2 | 0 | 0 | 0 | 0 |
| UE 2 | | | 0.5 | 0.2 | 0 | 0 | 0 | 0 |
| UE 3 | | | | 0.6 | 0.4 | 0.2 | 0 | 0 |
| UE 4 | | | | | 0.8 | 0.7 | 0.4 | 0.1 |
| UE 5 | | | | | | 0.8 | 0.5 | 0.2 |
| UE 6 | | | | | | | 0.8 | 0.6 |
| UE 7 | | | | | | | | 0.7 |
| UE 8 | | | | | | | | |

Only the upper triangle of the table needs to be estimated, since the lower part is symmetrical.

The table may then be used to form MU-MIMO groups wherein all UE:s of the same group have pairwise low correlation magnitudes (e.g., below a threshold; first criterion for sufficient communication quality).

Preferably, the groups may be formed so that a second or further UE is selected whose channel correlation is the largest available that does not exceed the threshold. This avoids forming groups with unnecessarily good interference properties, thereby reducing the risk of using UE:s that could be suitable candidates for other groups. For example, UE1 could easily be grouped with UE8, but that would make UE8 unavailable for grouping with UE4. Instead UE1 could be grouped with UE5, which would probably function equally well.

In the example of grouping these UE:s into four MU-MIMO pairs (groups) with a permissible correlation threshold value equal to 0.2, the group-forming process may comprise selecting the largest below-threshold value in the table and defining the corresponding UE pair (UE1 and UE4) as a MU-MIMO group (i.e., simultaneously selecting the first and second receiver; compare with steps 131 and 133 of FIG. 1).

Then the process may be repeated in a reduced table where the columns and rows for UE1 and UE4 are removed. The second group may comprise UE3 and UE6, the third group may comprise UE5 and UE8, and the fourth group may comprise UE2 and UE7.

The example can be extended in a straightforward manner to any group size (e.g., selecting triplets where all correlations for the three UE pairs of a group should be below a threshold).

In some embodiments (e.g., when the MU-MIMO grouping is not aggressive in relation to the number of UE:s and the spatial properties of the deployment), the table may be formed by simply marking entries having a correlation magnitude below the threshold, and the group-forming may comprise grouping any UE:s with mutually low correlation.

After determining the groups in a correlation-based approach, the network may transmit signals in a MU-MIMO manner using transmit beamforming towards the selected UE groups; e.g., matched filter beamforming $W=H^H$, zero-forcing (ZF) beamforming, or minimum mean square error (MMSE) beamforming. The latter two entails the ability to, while transmitting to one UE, steer nulls in the directions of other UE:s.

In some embodiments, these approaches assume that reciprocity between UL receive antenna weights and DL transmit antenna weights is established in the TRP antenna array. Then, the UL channel estimates for users may be utilized for calculation of precoding weights for DL transmission to the same users.

In some embodiments, all UE:s may transmit SRS for channel estimation at the TRP or report channel estimates (e.g. based on DMRS or CSI-RS) or some related precoding indication info (e.g., a preferred combination of beam and precoding) to the network. If the channel estimates are obtained in element domain, the network may transform them into beam domain. The approach described above in relation to FIG. 3 may then be utilized, forming MU-MIMO transmission groups by determining a subset of beams where, for each beam, only one UE has a strong correlation. MU-MIMO precoding for a group may then comprise transmitting to each UE in the group using the beam for which the own correlation is high and cross-correlations with other UE:s are low.

The description herein focuses on examples for DL MU-MIMO. However (e.g., when reciprocity can be assumed), similar criteria and procedures may be equally applicable to UL MU-MIMO transmissions.

Even if measurement and estimation procedures have been exemplified for single-antenna UEs, various embodiments may be equally applicable for UE:s with multiple antennas.

Figure 4:
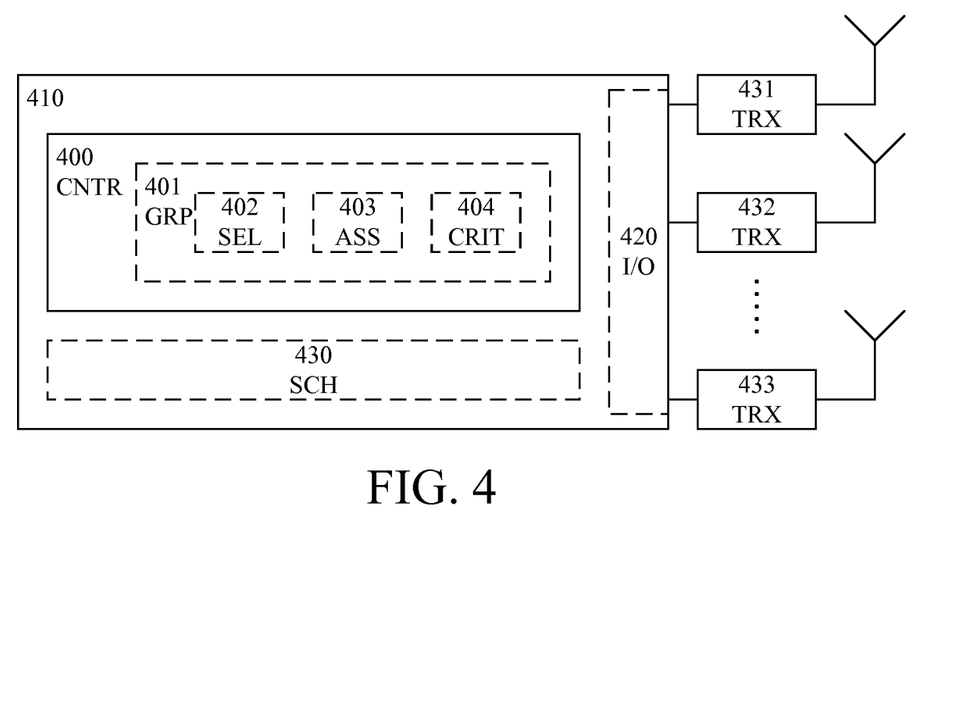
FIG. 4 is a schematic block diagram illustrating an example apparatus according to some embodiments.

FIG. 4 schematically illustrates an example apparatus 410 according to some embodiments. The apparatus 410 is a multi-user multiple-input multiple-output (MU-MIMO) scheduling apparatus for scheduling transmission from a plurality of transmission instances to a plurality of receivers. The apparatus 410 may, for example, be comprised in a network controlling device (e.g., a deployment server) comprising, or being associated with, a scheduler (SCH) 430.

For example, the apparatus 410 may be configured to cause performance of (e.g., perform) one or more of the method steps described for the method 100 of FIG. 1.

As mentioned before the receivers may be the users of the MU-MIMO scheme. For example, a receiver may be a user equipment (UE), or similar. A transmitter instance may, for example, be a transmission point (e.g., a network access point), or a transmission resource (e.g., a transmission beam usable by a transmission point or an antenna element of a transmission point), as exemplified in connection to FIGS. 2 and 3.

The apparatus comprises a controller (CNTR; e.g., controlling circuitry or a control module) 400.

The controller 400 is configured to cause acquisition, for each pair of a transmission instance and a receiver, of a communication quality metric (compare with step 120 of FIG. 1). To this end, the controller 400 may be associated with (e.g., connectable, or connected, to) one or more receivers (e.g., reception circuitries or reception modules; illustrated as transceivers, TRX, in FIG. 4) 431, 432, 433. The receivers may be configured to acquire the communication quality metrics and, when applicable, provide them to the apparatus 410 via an interface (I/O) 420.

The transceivers 431, 432, 433 may be comprised in the apparatus 410, or may be comprised in separate (possibly respective) apparatus(es). For example, each transceiver may be a transmission point or a transceiver chain of an antenna element.

The controller 400 may also be configured to cause configuration of the receivers to provide communication quality metric information (compare with step 110 of FIG. 1).

The controller 400 is further configured to cause forming of two or more groups of receivers from the plurality of receivers (compare with step 130 of FIG. 1).

As explained above, the forming of a group comprises selection of a first receiver as a first group member and associating a first transmission instance to the first receiver, and (responsive to a plurality of communication quality metrics of the first transmission instance and not yet selected receivers fulfilling a first criterion for sufficient communication quality) selection of a further (e.g., second, third, fourth, etc.) receiver from the not yet selected receivers as a further group member and association of a corresponding transmission instance to the further receiver.

For each selection of a receiver, the communication quality metric of an earlier associated transmission instance and the selected receiver typically fulfills the first criterion for sufficient communication quality and indicates a lower communication quality than the highest communication quality among the plurality of communication quality metrics that fulfill the first criterion for sufficient communication quality. When all communication quality metrics of earlier associated transmission instances and not yet selected receivers that fulfill the first criterion for sufficient communication quality are equal, any of the corresponding receivers may be selected (e.g., at random). When there is only one not yet selected receiver, it may be selected if the communication quality metrics of earlier associated transmission instances and the receiver fulfill the first criterion for sufficient communication quality. When there is only one not yet selected receiver and the communication quality metrics of earlier associated transmission instances and the receiver do not fulfill the first criterion for sufficient communication quality, the method may be restarted with some adjustment as explained above in connection with FIG. 1.

To this end, the controller 400 may be associated with (e.g., comprise) a selector (SEL; e.g., selecting circuitry or a selection module) 402, an associator (ASS; e.g., associating circuitry or an association module) 403, and a criterion checker (CRIT; e.g., criterion checking circuitry or a criterion checking module) 404; one or more of which may be comprised in a grouper (GRP; e.g., grouping circuitry or a grouping module) 401. The criterion checker may be configured to determine fulfillment of the first criterion for sufficient communication quality (and possibly other criteria as described herein). The selector and the associator may be configured, respectively, to select the receivers and associate the transmission instances, based on results from the criterion checker.

The controller 400 is also configured to cause scheduling of MU-MIMO transmission to the receivers of each group from the corresponding associated transmission instances (compare with step 140 of FIG. 1). To this end, the controller 400 may be associated with (e.g., connectable, or connected, to) a scheduler (SCH; e.g., scheduling circuitry or a scheduling module) 430. The scheduler may be configured to schedule MU-MIMO transmission to the receivers of each group from the corresponding associated transmission instances.

The controller 400 may further be configured to cause MU-MIMO transmission (compare with step 150 of FIG. 1), e.g., via the transceivers 431, 432, 433.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a scheduler or a deployment server.

Embodiments may appear within an electronic apparatus (such as a scheduler or a deployment server) comprising arrangements, circuitry, and/or logic according to any of the embodiments described herein. Alternatively or additionally, an electronic apparatus (such as a scheduler or a deployment server) may be configured to perform methods according to any of the embodiments described herein.

Figure 5:
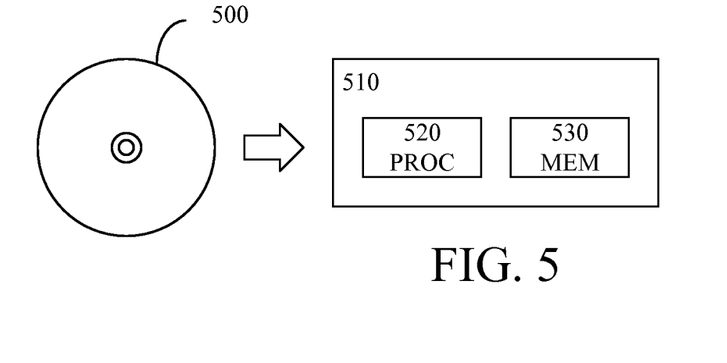
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a scheduler or a deployment server 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for scheduling transmission from a plurality of transmission instances to a plurality of receivers in a wireless network, the method comprising:
   acquiring respective communication quality metrics for each different pair of one of the transmission instances and one of the receivers;
   forming a first group of the plurality of receivers by performing the following selection operations:
      selecting a first one of the receivers as a first group member and associating a first one of the transmission instances to the first receiver; and
      when a plurality of the communication quality metrics for the first transmission instance and a plurality of unselected receivers fulfill a first criterion for sufficient communication quality, selecting a second receiver from the unselected receivers as a second group member and associating a second one of the transmission instance to the second receiver, wherein the communication quality metric of the first transmission instance and the second receiver fulfills the first criterion for sufficient communication quality and indicates a lower communication quality than a highest communication quality among the plurality of communication quality metrics that fulfill the first criterion for sufficient communication quality;
   forming at least a second group of receivers from the plurality of receivers by repeating the selection operations, used to form the first group, for receivers not included in the first group of receivers; and scheduling multi-user multiple-input multiple-output (MU-MIMO) transmission to the receivers of each formed group from the corresponding associated transmission instances.

2. The method of claim 1, wherein:
forming the first group of receivers further comprises, when a plurality of the communication quality metrics for the first transmission instance and a plurality of unselected receivers fulfill the first criterion for sufficient communication quality, selecting one or more further receivers from the unselected receivers as further first group members and associating further transmission instances to the further receivers; and
the communication quality metrics of the first transmission instance and the one or more further receivers fulfill the first criterion for sufficient communication quality and indicate lower qualities than the highest communication quality among the plurality of communication quality metrics that fulfill the first criterion for sufficient communication quality.

3. The method of claim 1, wherein the communication quality metric of the first transmission instance and the first receiver fulfills a second criterion for sufficient communication quality.

4. The method of claim 1, wherein the communication quality metric is indicative of a gain, or an attenuation, of a channel between the transmission instance and the receiver.

5. The method of claim 1, wherein the communication quality metric of the first transmission instance and the second receiver is indicative of an amount of cross-talk generated to the second receiver by transmission from the first transmission instance to the first receiver.

6. The method of claim 1, further comprising configuring the plurality of receivers to provide the communication quality metrics.

7. The method of claim 1, wherein:
the plurality of receivers are stationary or substantially stationary; and
the method is performed during a pre-operational time period that does not include communication transmission.

8. The method of claim 1, wherein the plurality of transmission instances are one of the following:
a plurality of distributed transmission points; or
a plurality of transmission beams.

9. A non-transitory computer readable medium, having stored thereon executable program instructions that, when executed by a processor or a controller of an apparatus configured to schedule transmission from a plurality of transmission instances to a plurality of receivers in a wireless network, cause the apparatus to perform operations corresponding to the method of claim 1.

10. An apparatus configured to schedule of transmission from a plurality of transmission instances to a plurality of receivers in a wireless network, the apparatus comprising a processor or a controller configured to:
acquire respective communication quality metrics for each different pair of one of the transmission instances and one of the receivers;
form a first group of the plurality of receivers by performing the following selection operations:
selecting a first one of the receivers as a first group member and associating a first one of the transmission instances to the first receiver; and
when a plurality of the communication quality metrics for the first transmission instance and a plurality of unselected receivers fulfill a first criterion for sufficient communication quality, selecting a second receiver from the unselected receivers as a second group member and associating a second one of the transmission instance to the second receiver, wherein the communication quality metric of the first transmission instance and the second receiver fulfills the first criterion for sufficient communication quality and indicates a lower communication quality than a highest communication quality among the plurality of communication quality metrics that fulfill the first criterion for sufficient communication quality;
form at least a second group of receivers from the plurality of receivers by repeating the selection operations, used to form the first group, for receivers not included in the first group of receivers; and
schedule multi-user multiple-input multiple-output (MU-MIMO) transmission to the receivers of each formed group from the corresponding associated transmission instances.

11. The apparatus of claim 10, wherein:
the processor or controller is further configured to, responsive to a plurality of the communication quality metrics for the first transmission instance and a plurality of unselected receivers fulfilling the first criterion for sufficient communication quality, form the first group of receivers by selecting one or more further receivers from the not yet selected receivers as further first group members and association of further transmission instances to the further receivers; and
the communication quality metrics of the first transmission instance and the one or more further receivers fulfill the first criterion for sufficient communication quality and indicate lower qualities than the highest communication quality among the plurality of communication quality metrics that fulfill the first criterion for sufficient communication quality.

12. The apparatus of claim 10, wherein the communication quality metric is indicative of a gain, or an attenuation, of a channel between the transmission instance and the receiver.

13. The apparatus of claim 10, wherein the communication quality metric of the first transmission instance and the second receiver is indicative of an amount of cross-talk generated to the second receiver by transmission from the first transmission instance to the first receiver.

14. The apparatus of claim 10, wherein the processor or controller is further configured configure the receivers to provide the communication quality metrics.

15. The apparatus of claim 10, wherein:
the plurality of receivers are stationary or substantially stationary; and
the processor or controller is configured to acquire the respective communication quality metrics, form the first group and the at least one second group, and schedule the MU-MIMO transmission during a pre-operational time period that does not include communication transmission.

16. The apparatus of claim 10, wherein the plurality of transmission instances are one of the following:
a plurality of distributed transmission points; or
a plurality of transmission beams.

17. A deployment server configured to facilitate deployment of a plurality of receivers in a wireless network in an industrial environment, wherein the deployment server comprises the apparatus of claim 10.

18. A network node of a wireless network, wherein the network node comprises the deployment server of claim 17.

19. The network node of claim 18, wherein the plurality of transmission instances are one of the following:
 a plurality of distributed transmission points coupled to the network node; or
 a plurality of transmission beams generated by an antenna array coupled to the network node.

20. The network node of claim 18, wherein the network node is a base station.

* * * * *